(12) United States Patent
Glusiec et al.

(10) Patent No.: US 12,605,849 B2
(45) Date of Patent: Apr. 21, 2026

(54) FORCE OVERSHOOT AND OTHER PRESSURE DISTURBANCE MITIGATION IN PNEUMATIC FORCE CONTROL DEVICES

(71) Applicant: ATI Industrial Automation, Inc., Apex, NC (US)

(72) Inventors: Andrew Glusiec, Apex, NC (US); Samuel Koenke, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 391 days.

(21) Appl. No.: 17/902,399

(22) Filed: Sep. 2, 2022

(65) Prior Publication Data

US 2023/0191558 A1 Jun. 22, 2023

Related U.S. Application Data

(60) Provisional application No. 63/292,463, filed on Dec. 22, 2021.

(51) Int. Cl.
| | |
|---|---|
| *B25J 13/08* | (2006.01) |
| *B24B 49/08* | (2006.01) |
| *B24B 49/16* | (2006.01) |
| *B25J 19/02* | (2006.01) |
| *G05D 15/00* | (2006.01) |

(52) U.S. Cl.
CPC .............. *B25J 13/085* (2013.01); *B24B 49/08* (2013.01); *B24B 49/16* (2013.01); *B25J 19/02* (2013.01); *G05D 15/00* (2013.01)

(58) Field of Classification Search
CPC ...... B25J 13/08; B25J 13/085; B25J 19/0091; B25J 19/02; B25J 15/00; B24B 49/08; B24B 49/16; F16F 7/00; F16F 7/08; F16F 7/09; F16F 9/02; F15B 15/1447; F15B 15/222
See application file for complete search history.

(56) References Cited

U.S. PATENT DOCUMENTS

| | | | | | |
|---|---|---|---|---|---|
| 3,683,748 | A | * | 8/1972 | Mahl | A01D 57/04 |
| | | | | | 137/625.68 |
| 4,657,470 | A | * | 4/1987 | Clarke | H05K 13/0413 |
| | | | | | 414/737 |
| 4,771,674 | A | * | 9/1988 | Hugdahl | F15B 11/06 |
| | | | | | 91/217 |

(Continued)

FOREIGN PATENT DOCUMENTS

| | | | | | |
|---|---|---|---|---|---|
| GB | 2073322 | A | * | 10/1981 | F15B 15/1447 |

*Primary Examiner* — Joseph Brown
(74) *Attorney, Agent, or Firm* — COATS & BENNETT, PLLC

(57) ABSTRACT

Pressure disturbances in a pneumatic robotic force control device—including force overshoot upon initial contact between a robotic tool and a workpiece—are mitigated by increasing the mass air flow in or out of a pneumatic chamber via one or more force overshoot mitigation air passages formed in the robotic force control device. The force overshoot mitigation air passages may connect the two chambers in air flow relationship, or may allow air flow from a chamber to the exterior. The force overshoot mitigation air passages may have a static or variable effective area. The optimal area may be calculated based on measured flow rates and pressures during typical use cases.

16 Claims, 12 Drawing Sheets

(56) References Cited

U.S. PATENT DOCUMENTS

| | | | | | |
|---|---|---|---|---|---|
| 5,325,636 | A | * | 7/1994 | Attanasio | B24B 35/00 |
| | | | | | 451/24 |
| 5,498,121 | A | * | 3/1996 | Todo | B25J 19/0091 |
| | | | | | 74/490.06 |
| 6,170,806 | B1 | * | 1/2001 | Mintgen | F16F 9/3207 |
| | | | | | 267/64.11 |
| 8,517,796 | B2 | * | 8/2013 | Shinozaki | B24B 49/08 |
| | | | | | 451/5 |
| 9,375,840 | B2 | * | 6/2016 | Naderer | B25J 9/1687 |
| 10,746,202 | B2 | * | 8/2020 | Tetrick | F15B 11/20 |
| 2013/0061741 | A1 | * | 3/2013 | Link | F15B 15/1447 |
| | | | | | 91/422 |
| 2019/0085872 | A1 | * | 3/2019 | Ogawa | F15B 15/149 |

* cited by examiner

PNEUMATIC CONTROL
SYSTEM
26

EXHAUST ▽          ◉ SOURCE

FORCE OVERSHOOT AND OTHER PRESSURE DISTURBANCE MITIGATION IN PNEUMATIC FORCE CONTROL DEVICES

RELATED APPLICATION

This application claims the benefit of U.S. Provisional Application No. 63/292,463, filed Dec. 22, 2021, the entire disclosure of which is being hereby incorporated by reference herein.

FIELD OF INVENTION

The present invention relates generally to robotics, and in particular to mitigation of force overshoot and other pressure disturbances in pneumatic robotic force control devices, by an increase in mass air flow rate via one or more force overshoot mitigation air passages.

BACKGROUND

Robots are an indispensable part of manufacturing, testing, assembly, and packing of products; assistive and remote surgery; space exploration; operation in hazardous environments; and many other applications. Many robots, or tool attached thereto, measure forces (including torques) applied by contact with a workpiece or the environment, or experienced by the robotic as a result of such contact. These forces are fed back to the robotic control system, which controls the position and/or movement of the robot based, at least in part, to control the force. Such systems are known as force control devices. Examples include material removal (grinding, sanding, and the like), automated parts placement, remote digging or other manipulation of the environment, and the like. Without loss of generality, the present disclosure will consider material removal tools as a representative case of the need for, and design of, robotic force control devices.

In many manufacturing processes, the basic dimensional shapes of parts are achieved by machining, casting, forging, molding, or similar processes. These processes are sufficient to meet dimensional specifications, but the parts require additional processing to achieve a desired surface finish. For example, machined parts may require that residual marks and scallops be removed. As another example, parts that are injection molded, cast, or forged may have flashing, gates, and/or parting lines that must be removed. Robotic material removal tools are often used to achieve these finishing operations.

For a variety of reasons, such as the stiffness of a robot arm, the achievable granularity of its robotic positioning, and the like, real-time force adjustments are difficult or impossible to achieve in real-world material removal operations. Accordingly, compliant force control devices are known in the art. A force control device is an assembly interposed between the robot arm and a material removal tool (sander, grinder, etc.), which allows some compliance, or movement of the material removal tool relative to the robot arm—also referred to as "give" or "slack." A compliant force control device allows the material removal tool to follow slight changes in contours of a workpiece, while the programmed robot path is a straight line. One known mechanism for providing force control compliance is a pneumatic cylinder.

FIG. 1 depicts a representative compliant robotic force control device 10, comprising a housing 12, pneumatic cylinder 14 containing a pneumatic piston 16 and rod 18, and a linear carriage 20 connected to the rod 18. A material removal tool 22 is connected to the carriage 20. As the material removal tool 22 interacts with a workpiece 24, it may move linearly along a normal axis, as indicated by the motion arrow. A pneumatic control system 26 regulates the force applied to the work piece 24 by the material removal tool 22, and provides for compliance motion of the material removal tool 22, by regulating the pressure in chambers of the cylinder 14 on both sides of the piston 16.

In some respects, the state of the art of robotic material removal still strives to mimic human performance. FIG. 2 plots measured force applied by a human operator to a workpiece in the course of material removal. The curve on the left plots the force when applying rotary oscillation with hand-held sandpaper. The curve on the right plots the force applied in linear oscillation with sandpaper in a sanding block. As these curves show, a human operator is well able to regulate the increase in applied force as the material removal process begins.

Initial contact of a robotic material removal tool with a workpiece—even through a compliant force control device—typically includes an impact force overshoot, which may result in poor finish quality, or even damage to the workpiece.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, pressure disturbances in a pneumatic robotic force control device—including force overshoot upon initial contact between a robotic tool and a workpiece—are mitigated by increasing the mass air flow in or out of a pneumatic chamber via one or more force overshoot mitigation air passages formed in the robotic force control device. The force overshoot mitigation air passages may connect the two chambers in air flow relationship, or may allow air flow from a chamber to the exterior. The force overshoot mitigation air passages may have a static or variable effective area. The optimal area may be calculated based on measured flow rates and pressures during typical use cases.

One embodiment relates to a robotic force control device configured to be interposed between a robot arm and a robotic tool. The robotic force control device includes a carriage capable of linear motion along an axis and configured to be connected to a robotic tool; a pneumatic cylinder containing a piston dividing the cylinder into first and second chambers; a rod connected to the piston and protruding from the cylinder, the rod connected to the carriage outside of the cylinder; a pneumatic control system connected in air flow relation with each of the first and second cylinder chambers via respective first and second air lines;

and at least one force overshoot mitigation air passage configured to increase a mass air flow rate to or from at least one of the chambers and thereby reduce effect of pressure disturbances in the piston chambers upon movement of the carriage.

Another embodiment relates to a method of operating a robotic force control device interposed between a robot arm and a robotic tool, the device comprising a carriage capable of linear motion along an axis and configured to be connected to a robotic tool, a pneumatic cylinder containing a piston dividing the cylinder into first and second chambers, a rod connected to the piston and protruding from the cylinder, the rod connected to the carriage outside of the cylinder, and a pneumatic control system connected in air flow relation with each of the first and second cylinder chambers via respective first and second air lines. A mass air flow rate to or from at least one of the chambers is increased via at least one force overshoot mitigation air passage, to thereby reduce the effect of pressure disturbances in the piston chambers upon movement of the carriage. The robot arm is moved such that the robotic tool contacts a workpiece, whereby the carriage moves relative to the pneumatic cylinder.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Analysis of the impact force overshoot proceeds from consideration of the position of a material removal tool 22 before, at, and following initial contact with a workpiece 24. It is known that elastic deformations in the tool or workpiece surface can help reduce the impact energy. We will analyze the impact state where tool and workpiece are considered rigid, and thus comprising a worst case contact event.

Figure 1:
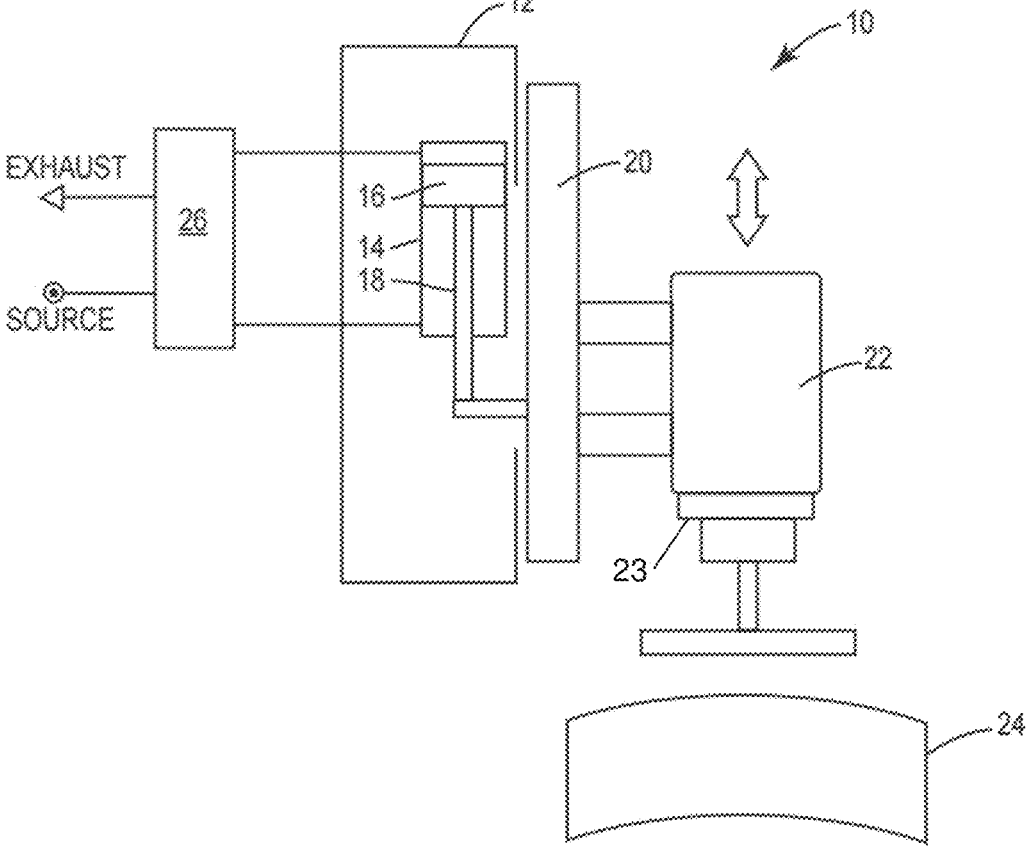
FIG. 1 is a diagram of a compliant force control device for a robotic material removal tool.
Figure 2:
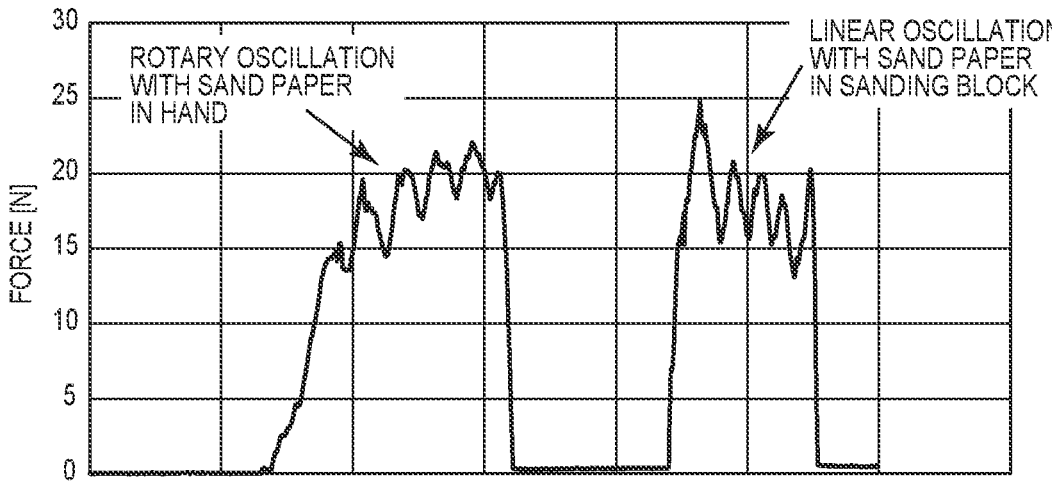
FIG. 2 is a graph of force applied by a human operator in material removal operations on a workpiece.
Figures 3A, 3B, 3C:
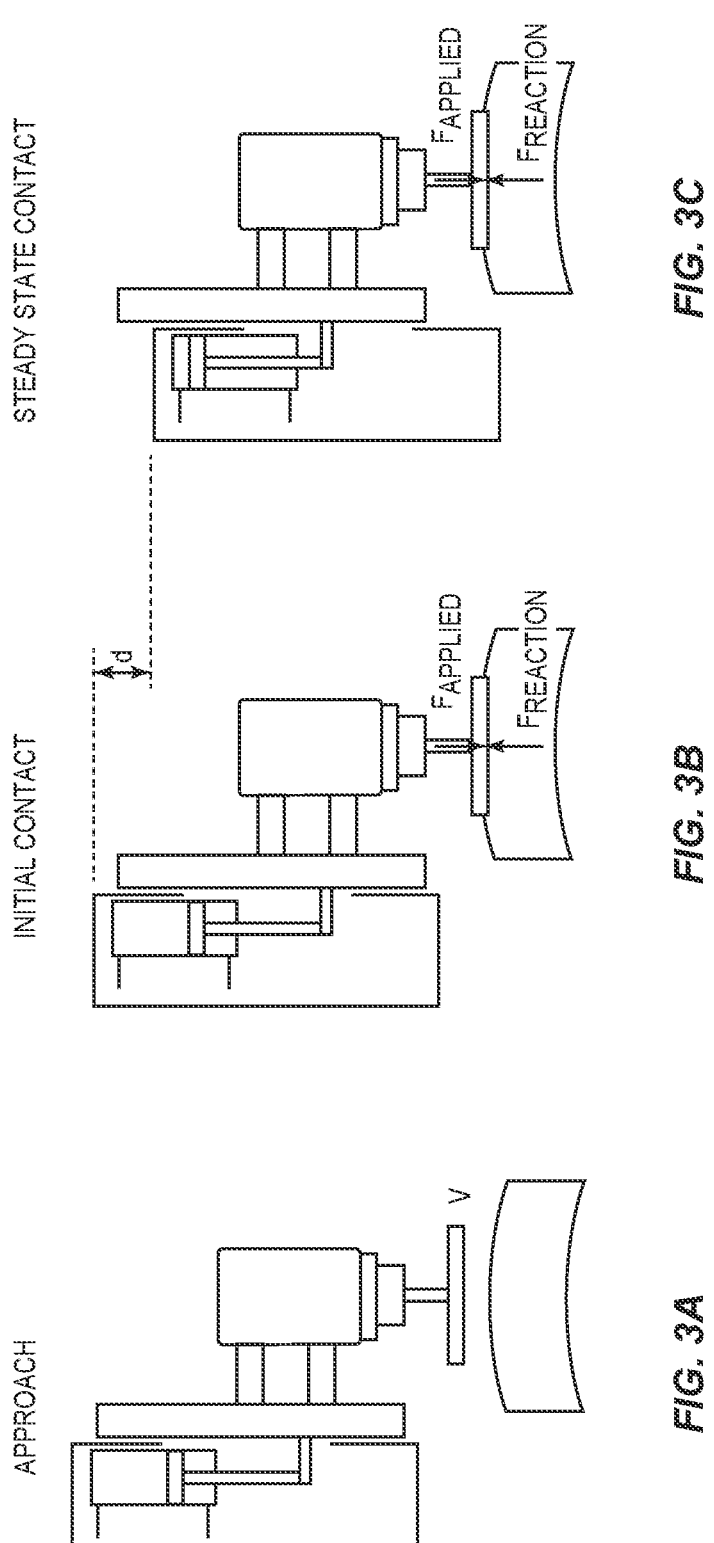
FIG. 3A is a diagram of the approach of a robotic material removal tool to a workpiece.
FIG. 3B is a diagram of initial contact between the robotic material removal tool and the workpiece.
FIG. 3C is a diagram of steady state contact between the robotic material removal tool and the workpiece.

FIG. 3A shows the robotic material removal tool 22 approaching a workpiece 24 with relative velocity v. This is known as process to part (workpiece) motion, and is assumed herein. Of course, the same analysis applies to part to process motion, where the tool 22 is stationary, and the workpiece 24 is moved into contact with it. Prior to contact, the piston 16 is positioned generally forward in the pneumatic cylinder 14, allowing for compliance motion of the material removal tool 22.

FIG. 3B depicts initial contact between the material removal tool 22 and the workpiece 24, generating equal and opposite applied and reactive forces. Although the material removal tool 22 stops at this point, relative motion of the force control device housing 12 continues.

FIG. 3C depicts a steady state contact between the material removal tool 22 and the workpiece 24. Note that the force control device housing 12 is displaced a distance d relative to its position at initial contact (FIG. 3B); the piston 16 is displaced within the pneumatic cylinder 14 the same distance. Relative velocity between the force control device 10 and the workpiece 24 is now zero.

Figure 4:
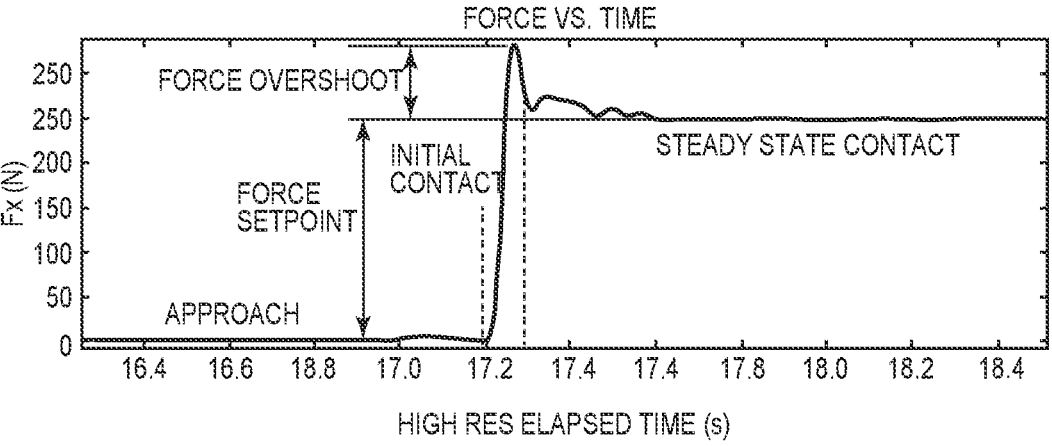
FIG. 4 is a graph of force applied by the robotic material removal tool to the workpiece over the positions depicted in FIGS. 3A-C.

FIG. 4 graphs the force between the material removal tool 22 and the workpiece 24 as their relative positions transition through the stages depicted in FIGS. 3A-C. Initially, during approach (FIG. 3A), the force is zero. A peak force occurs immediately following initial contact (FIG. 3B). The peak force comprises the desired steady state force (also known as the set point force), and a force overshoot. The force overshoot is often detrimental, and always undesired.

The force overshoot results primary from two force sources. The first of these results from dynamics of the force control device 10, and is modeled by equation (1):

$$F_{force\ control\ device} = m\frac{dv}{dt} - \beta v \qquad (1)$$

Figure 5:
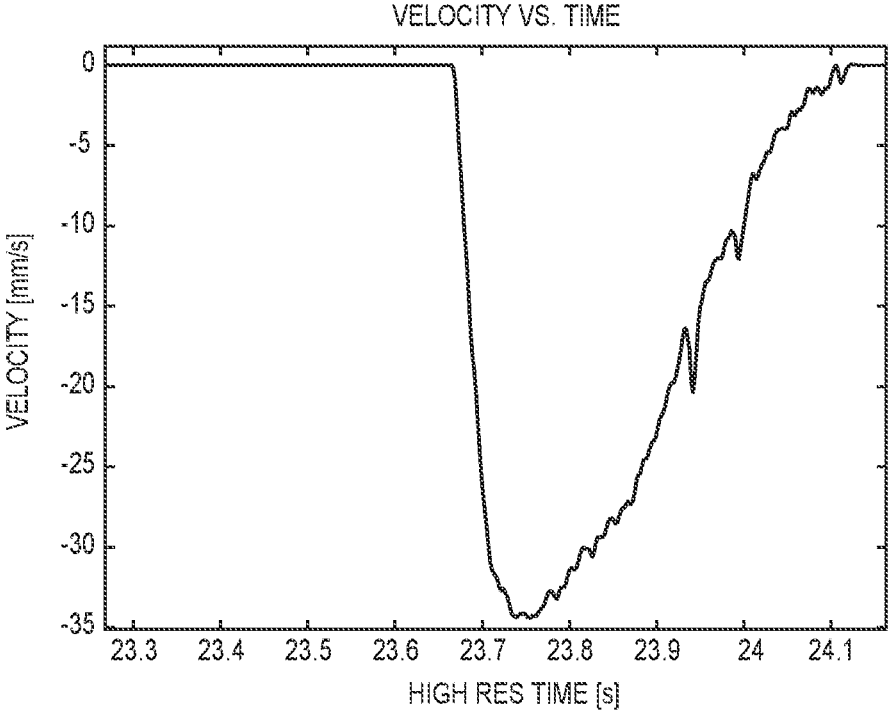
FIG. 5 is a graph of the velocity of a force control device carriage vs. time over the course of initial contact between a robotic material removal tool to a workpiece.

The first term in equation (1) represents the change in linear momentum of the force control device housing 12 upon the material removal tool 22 contacting the workpiece 24. FIG. 5 graphs the rapid changes in velocity of the force control device housing 12, relative to the carriage 20 and tool 22, over the duration of the force overshoot.

The second term in equation (1) relates a frictional force caused by the motion of the force control device housing 12 and viscous friction in moving components. Because most force control devices 10 strive to minimize friction in the system, so as to maximize various performance aspects, the first term in equation (1) dominates, and the second term can be disregarded.

Figure 6:
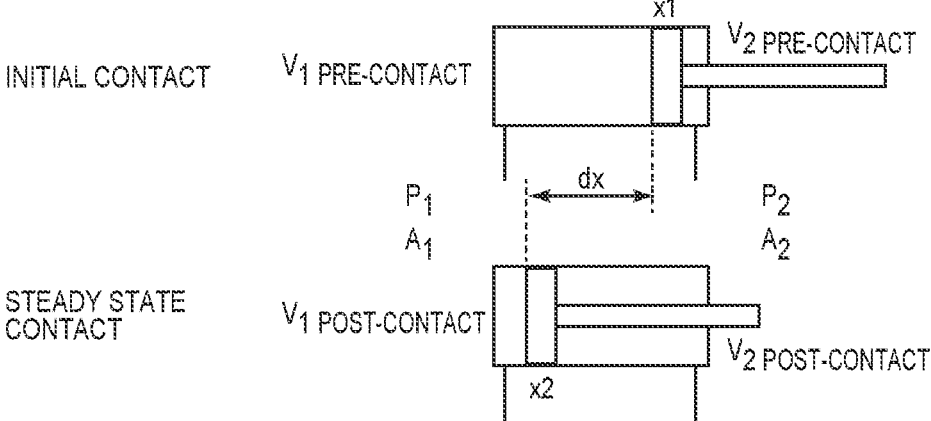
FIG. 6 shows initial and steady state positions of a piston within a pneumatic cylinder.

The second cause of the force overshoot is pressure dynamics in the pneumatic cylinder 14. FIG. 6 demonstrates the change in pressures, resulting from volume changes in the chambers, that drive this dynamic. At the instant of initial contact (FIG. 3B), the carriage 20 is positioned such that cylinder piston 16 is in position x1. Upon contact of the material removal tool 22 with the workpiece 24, the relative motion difference between the workpiece 22 and force control device housing 12 drives the carriage 20 to a settling position x2. The change in carriage 20 position, and thus cylinder piston 16 stroke, is dx. A simple force balance across the cylinder 14 shows the output force of the cylinder 12:

$$F_{cylinder} = P_1 A_1 - P_2 A_2 \qquad (2)$$

At the instant of initial contact (IC), the pressures $P_{1\_IC}$ and $P_{2\_IC}$ are set such that $F_{cylinder}$ matches the desired contact force. Additionally, the force control device 10 assumes the end of stroke position to seek contact with the workpiece. This position will have associated cylinder volumes $V_{1\_IC}$ and $V_{2\_IC}$ in the chambers formed in the cylinder 14 by the piston 16. During the initial contact phase, the cylinder piston 16 is displaced by a distance dx. Assuming compressed air is an ideal gas, and that the displacement occurs sufficiently quickly, the process can be approximated as adiabatic. The change in force output of the cylinder 14, from initial contact to steady state contact (SSC) is given by equation 3:

$$\Delta F_{cylinder} = P_{1\_IC}\left(\frac{V_{1\_IC}}{V_{1\_IC} + dxA_1}\right)^k A_1 - P_{2\_IC}\left(\frac{V_{2\_IC}}{V_{2\_IC} - dxA_2}\right)^k A_2 \qquad (3)$$

where k is the ratio of specific heats, and for air k=1.4.

As equation 3 shows, the displacement of the piston 16 to compress chamber 1 will raise the pressure in chamber 1. In the same way, the displacement of the piston 16 that expands the volume in chamber 2 will lower the pressure in chamber 2.

Figures 7A, 7B, 8A, 8B:
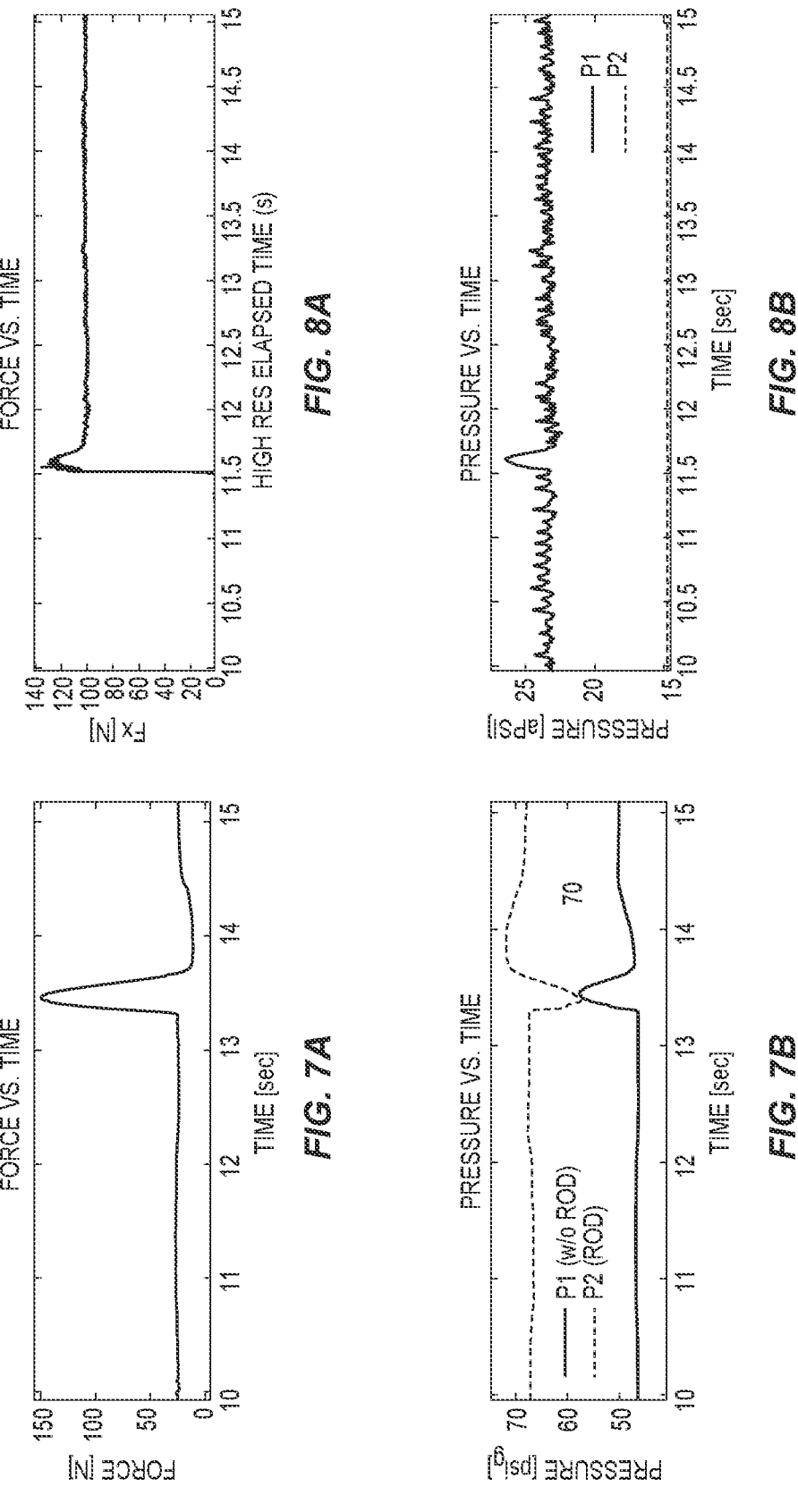
FIG. 7A is a graph of force vs. time for initial contact with a workpiece for a force control device with low force overshoot mitigation air flow.
FIG. 7B is a graph of pressure in two chambers vs. time corresponding to the force depicted in FIG. 7A.
FIG. 8A is a graph of force vs. time for initial contact with a workpiece for a force control device with high force overshoot mitigation air flow.
FIG. 8B is a graph of pressure in two chambers vs. time corresponding to the force depicted in FIG. 8A.

The change in force described in equation (3) depends on the assumption that the displacement of the piston 16 by dx occurs over a short time scale, dt. The duration of dt relates to how quickly air and can flow in out and out of the chambers of the cylinder 14. If the rate of mass air flow in and out of the chambers is slow, then the effect is present for larger values of dt (i.e., slower relative impact velocities). If the mass airflow rate is high, then the effect is strongest for smaller values of dt (i.e., larger relative impact velocities). The strength of the pressure change effect on the force overshoot is shown in FIGS. 7A-B and 8A-B, graphing force (FIGS. 7A, 8A) and pressure (FIGS. 7B, 8B) vs. time. FIG. 7 depicts a slower air flow rate, and shows how dramatic this effect can be. FIG. 8 depicts a faster air flow rate, and shows that the effect is reduced, but still present. As these graphs indicate, increased mass air flow in the pneumatic system decreases the effect of pressure disturbances in the pneumatic cylinder chambers.

According to aspects of the present disclosure, a robotic force control device 10 is configured to be interposed between a robot arm and a robotic tool 22. The robotic force control device 10 includes a carriage 20 that is capable of linear motion along an axis and is configured to be connected to a robotic tool 24. The robotic force control device 10 further includes a pneumatic cylinder 14, disposed in a housing 12. The cylinder 14 contains a piston 16 dividing the cylinder into first and second chambers. A rod 18 is connected to the piston 16, and protrudes from the cylinder 14. The rod 18 is connected to the carriage 20 outside of the cylinder 14. The robotic force control device 10 further includes a pneumatic control system 26 connected in air flow relation with each of the first and second cylinder chambers via respective first and second air lines. At least one force overshoot mitigation air passage is configured to increase a mass air flow rate to or from at least one of the chambers, and thereby reduce the effect of pressure disturbances in the piston chambers upon relative movement between the housing 12 and carriage 20.

In various aspects, the force overshoot mitigation air passage may take different forms. The force overshoot mitigation air passage is located downstream of the pneumatic control device. Possible locations for the force overshoot mitigation air passage include the piston 16, anywhere in the cylinder 14, or the air lines connecting the chambers to the pneumatic control system 26. Test results indicate that the closer the force overshoot mitigation air passage is to the cylinder chambers, the more effective the disturbance correction is for a given flow rate. Stated differently, a higher flow rate is required for a force overshoot mitigation air passage located in an air line, compared to placement of the air passage in the cylinder 14 (possibly due to the propagation of pressure waves through the air line lengths).

Figure 9A:
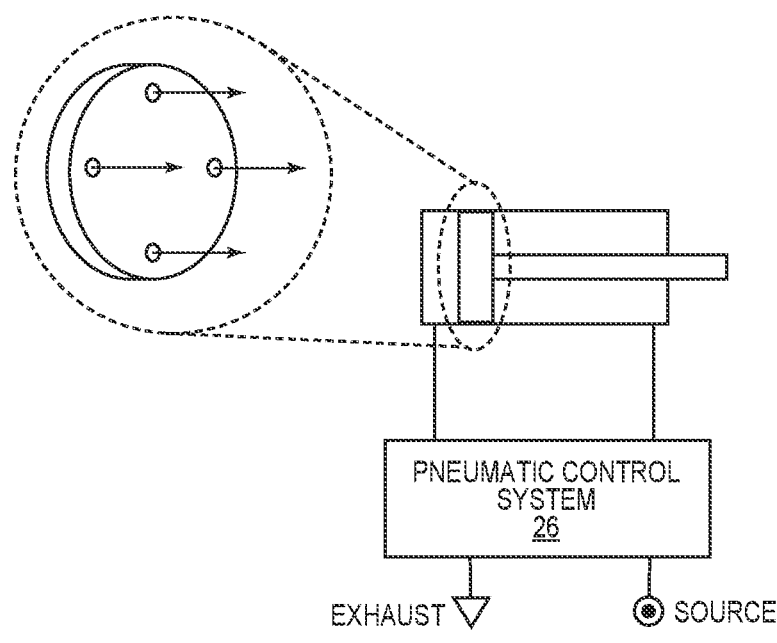
FIG. 9A depicts a force overshoot mitigation air passage in the form of one or more through-holes in a piston.

FIG. 9A depicts force overshoot mitigation air passages according to one aspect. In this aspect, the force overshoot mitigation air passages comprise one or more through-holes in the piston 16. The through-holes connect the two cylinder chambers in air flow relationship. Forming the force overshoot mitigation air passage in this manner may allow the air mass flow rate to vary over the cylinder's stroke.

Figure 9B:
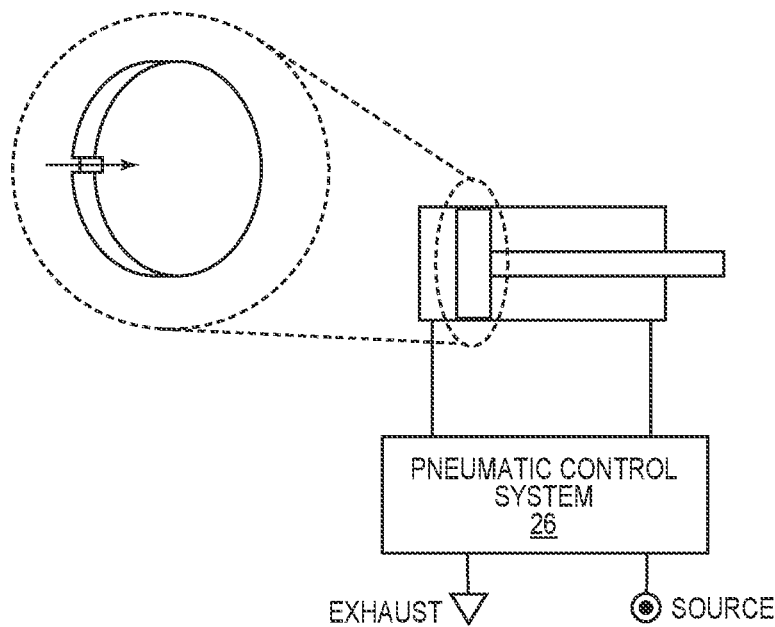
FIG. 9B depicts a force overshoot mitigation air passage in the form of one or more through-notches in a piston.

FIG. 9B depicts a force overshoot mitigation air passage according to another aspect. In this case, the force overshoot mitigation air passage comprises a through-notch formed at the periphery of the piston 16. The notch connects the two cylinder chambers in air flow relationship. A plurality of such notches may be formed. In one aspect, the notches are regularly spaced radially about the periphery of the piston 16.

Figure 9C:
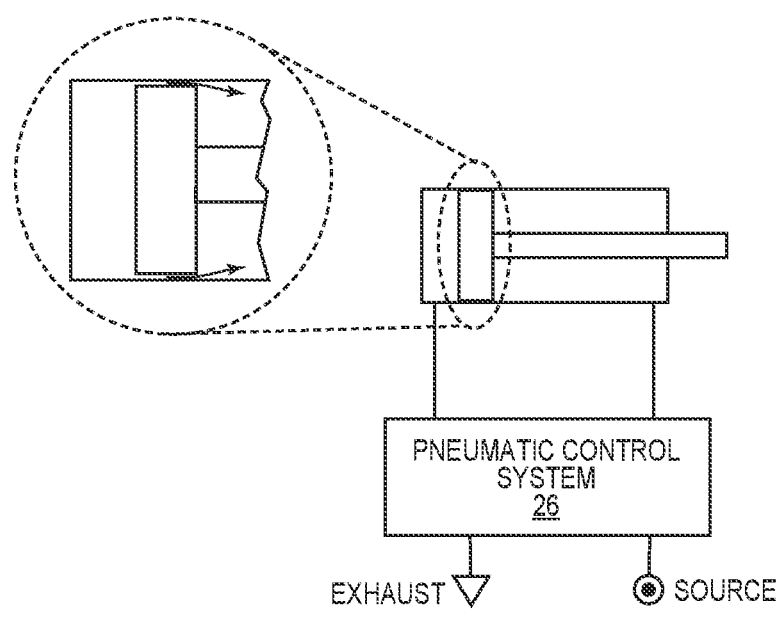
FIG. 9C depicts a force overshoot mitigation air passage in the form of an annular space between the periphery of the piston and the interior wall of the cylinder.

FIG. 9C depicts a force overshoot mitigation air passage formed as an annular space between the periphery of the piston 16 and the interior wall of the cylinder 14. The annular space connects the first and second chambers in air flow relationship.

Figure 9D:
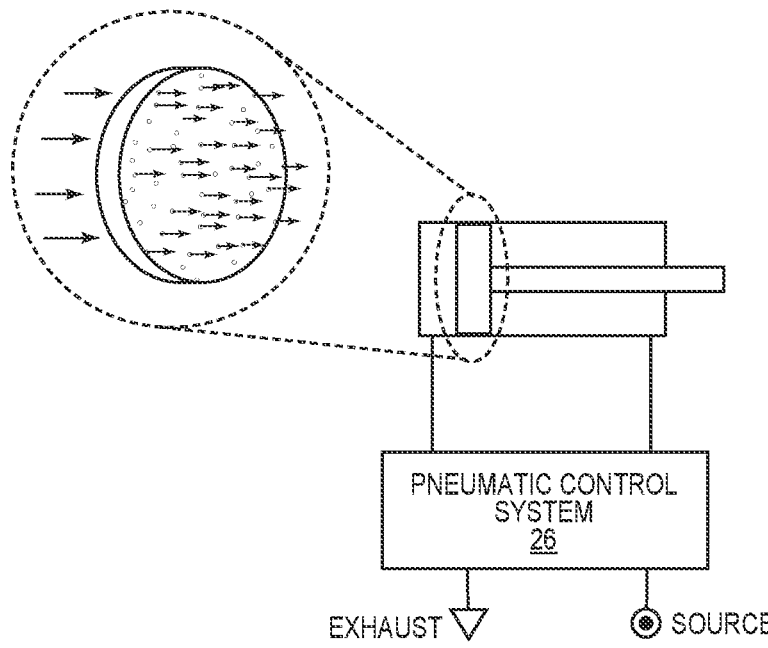
FIG. 9D depicts a force overshoot mitigation air passage in the form of fabrication of the piston from a porous and permeable material.

FIG. 9D depicts the force overshoot mitigation air passage formed by fabrication of the piston 14 from a porous and permeable material, such as aluminum, graphite, or bronze, when certain manufacturing processes known in the art are applied (to name a few materials that have both the mechanical strength for piston 14 operation, and also allow air flow through them). When these casting processes are applied, a very large plurality of very small, interconnected voids or pores in the material effectively form a plurality of air passages, as air is able to flow through the material from one side to the other.

In all of the aspects depicted by FIGS. 9A-D, air flows from the high-pressure side to the low-pressure side of the cylinder 16. However, the extra air flow always enters a cylinder chamber, and thus is already flowing to where the pressure disturbances will occur.

Figure 9E:
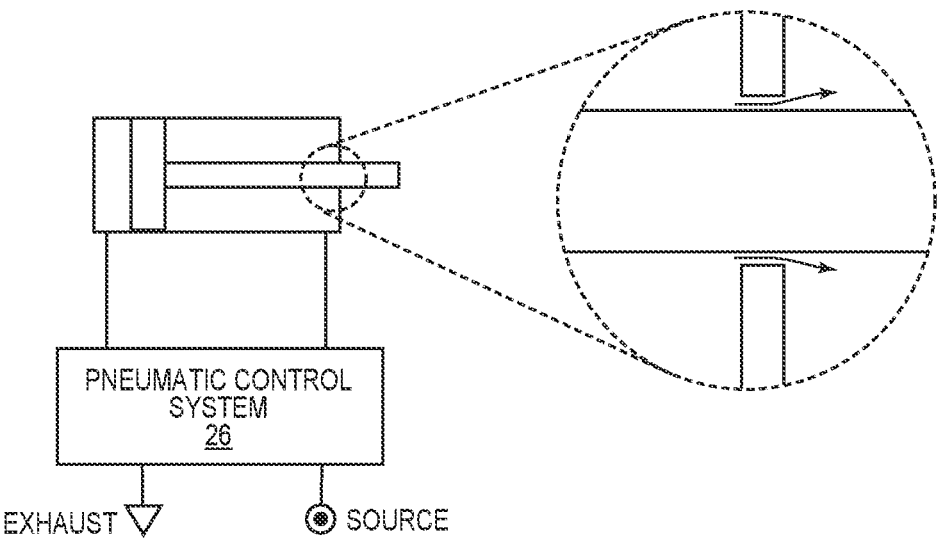
FIG. 9E depicts a force overshoot mitigation air passage in the form of an annular space between the periphery of a rod and a passage through which the rod exits a cylinder.

FIG. 9E depicts a force overshoot mitigation air passage formed as an annular space between the periphery of the rod 18 and a passage through which the rod 18 exits the cylinder 14. The annular space allows air flow from the first chamber (that is, the chamber closer the workpiece 24) to the exterior. While this mitigates force perturbations caused by pressure chambers in only the first chamber, it lowers the cumulative force overshoot caused by pressure dynamics in the pneumatic cylinder 14.

Figure 9F:
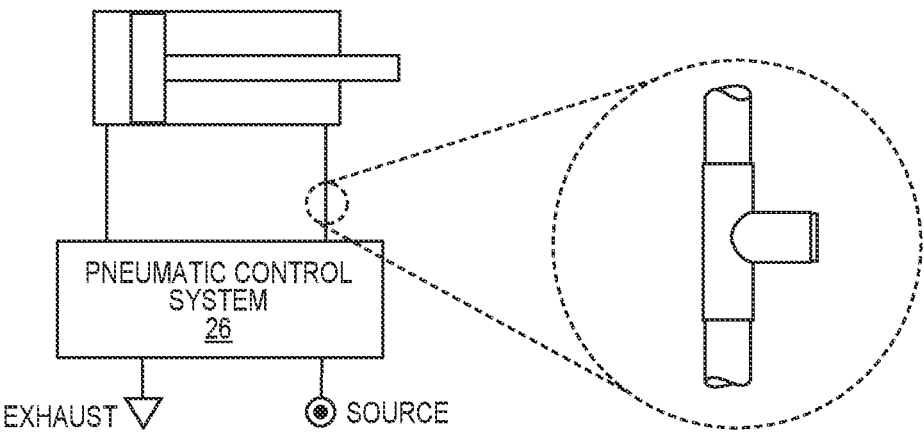
FIG. 9F depicts a force overshoot mitigation air passage in the form of a static or variable leak in one or both of the air lines connecting cylinder chambers with a pneumatic control system.

FIG. 9F depicts a force overshoot mitigation air passage formed as a static or variable leak in one or both of the air lines connecting the cylinder chambers with the pneumatic control system 26. The static or variable leak(s) allows air flow from the connected chamber(s) to the exterior. The desired effective vent area, to attain a certain flow rate, can be achieved in many different ways, including through a "T" or "Y" connector on the air tube, with a plug having a vent area embedded in it, or a manual flow restrictor. Calculation of the effective vent area is described in greater detail below.

In one aspect, the plug in the "T" or "Y" connector on the air tube is replaced with a 2-port valve that allows the vent area to be modified. One benefit of a variable vent area is that the air flow rate can be changed depending on the operating pressure. Since a higher flow rate yields faster disturbance response, the area can be opened at lower pressures, where the smaller pressure gradient does not require a high flow rate. At higher pressures, where the greater pressure gradient requires a larger flow rate, the area can be decreased to slow the flow rate to the desired level. Using a variable vent area allows performance over the entire pressure range of the force control device 10 to be addressed, while ensuring the flow demands of the highest pressures can be met. A suitable 2-port valve for this application is the ProControl proportional solenoid valve, PV10P12080A0, available from Humphrey Products Company of Kalamazoo, MI.

Figure 9G:
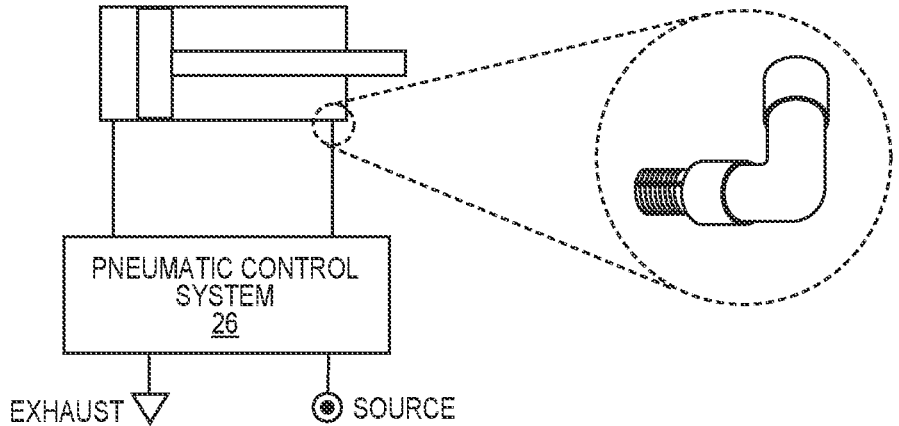
FIG. 9G depicts a force overshoot mitigation air passage in the form of a static leak in one or both of connectors that couple the air lines from the pneumatic control system to cylinder chambers.

FIG. 9G depicts a force overshoot mitigation air passage formed as a static leak in one or both of connectors that couple the air lines from the pneumatic control system 26 to the cylinder chambers. The static or variable leak(s) allows air flow from the connected chamber(s) to the exterior. The force overshoot mitigation air passage can be realized, in one aspect, by machining a notch into threads of the connector. When the connector is threaded into the cylinder, the notch allows air to escape past the threads and out past a connector seal. Testing has shown this method to be quite effective to venting the pressure disturbances in the cylinder chambers.

Note that, at least for the force overshoot mitigation air passages according to the aspects depicted in FIGS. 9E-G, air is vented to the exterior. This will result in the pneumatic control system 26 continuously supplying a small airflow, even when in a steady state pressure hold within the cylinder 14.

In all of the aspects depicted in 9A-G, the one or more force overshoot mitigation air passages increase the mass air flow rate to or from at least one of the chambers. This increased mass flow rate reduces the effect of pressure disturbances in the piston chambers upon relative movement between the housing 12 and carriage 20.

Again assuming air to be an ideal gas, and adiabatic processes within the cylinder 14, the rate of pressurization is modeled by equation (4):

$$P = \frac{kRT}{V}\dot{m} - \frac{kP}{V}\dot{V} \tag{4}$$

where $\dot{P}$, $\dot{m}$, and $\dot{V}$ are rates of change of pressure, mass, and volume, respectively.

As equation (4) shows, the rate of pressurization depends on the rate of net mass air flow into the volume of a chamber, and the rate of change of the chamber volume itself. Accordingly, the larger the steady state mass air flow, the faster pressure disturbances can be corrected. The increased mass air flow allows the disturbance to self-correct—even before a closed-loop control device can drive a response to correct the disturbance. Note that although the system model used here is adiabatic, the same principle is applicable other thermodynamic processes.

An increased mass air flow rate, by provision of a force overshoot mitigation air passage in air flow relation to the chambers of a pneumatic cylinder 14, yields improved disturbance rejection performance. However, there are practical upper bounds on the amount of air flow that can be allowed in the system. The typical flow rates of the pneumatic control device 10 must be considered, such that the flow at the highest pressures can still be achieved. These flow rates are often available as pressure-flow curves from the device manufacturer, and these curves are helpful in ensuring the flow demands of a given system can be met for a given flow rate through an added force overshoot mitigation air passage.

Another key factor to consider includes the supply flows for the compressor system used to provide the pneumatic power to the force control device 10. Ensuring the force control device 10 uses only a reasonable amount of the air flow is critical to ensuring the pneumatic supply system 26 will have the power to run tools 22 and other devices needed for many material removal applications. Lastly, the audible sound of the flow of air out of the force overshoot mitigation air passages should be considered. At the highest pressures, the sound of the air flow could become alarming to users. Those of skill in the art should balance these concerns with the force overshoot mitigation performance.

In force control devices 10 where the force overshoot mitigation air passage is added through a machining step, the effective area of the force overshoot mitigation air passage should be determined. One way to achieve this is to tune the flow rate across the full pressure range of the force control device 10. As the flow rate is tuned, the operating pressure and air flow rate are measured. A pressure sensor placed near the cylinder yields a good approximation to the pressure inside the cylinder. A mass flow measurement (MFM) device placed on the air line gives an accurate measurement of the steady state flow performance with a given air passage area. Baseline MFM readings should be taken at various pressures to ascertain the system's base level of air flow. These values are then subtracted from the MFM readings taken during force overshoot mitigation air passage tests, in order to determine the actual vented air flow rate.

Once the flow rate has been tuned to find the optimal tradeoff in performance and high pressure—such that the max output force can still be reached—a simple thin-port flow model is used to compute the force overshoot mitigation air passage area, from the recorded flow rates and corresponding pressures. The thin-port flow model describes a relationship between the mass airflow ṁ, through an orifice of area a, and the pressure-dependent, non-linear forcing function f.

$$\dot{m} = a_{vent} f(P_{Hi}, P_{Lo}) \tag{5}$$

where $P_{Hi}$ and $P_{Lo}$ represent the absolute referenced high and low pressure values. The forcing function f can be defined as $$f(P_{Hi}, P_{Lo}) = \begin{cases} \alpha P_{Hi} \sqrt{\left(\frac{P_{Lo}}{P_{Hi}}\right)^{\frac{2}{k}} - \left(\frac{P_{Lo}}{P_{Hi}}\right)^{\frac{k}{k+1}}} & \frac{P_{Hi}}{P_{Lo}} \le \theta \\ \beta P_{Hi} & \frac{P_{Hi}}{P_{Lo}} > \theta \end{cases} \tag{6}$$

where the constants $\alpha$, $\beta$, and $\theta$ are given by equations (7)-(9):

$$\alpha = C_d \sqrt{\frac{2M}{ZRT} \frac{k}{k-1}} \tag{7}$$

$$\beta = C_d \sqrt{\frac{kM}{ZRT} \left(\frac{2}{k+1}\right)^{\frac{k+1}{k-1}}} \tag{8}$$

$$\theta = \left(\frac{k+1}{2}\right)^{\frac{k}{k-1}} \tag{9}$$

The physical constants are defined in Table 1:

TABLE 1

| Physical Constants | | |
| --- | --- | --- |
| Parameter | Value | Description |
| T | 295.15 | Temperature [K] |
| M | 0.029 | Molecular Mass of Air [kg/mol] |
| R | 8.31 | Universal Gas Constant [Pa m³/mol K] |
| $C_d$ | 0.72 | Discharge Coefficient |
| Z | 0.99 | Compressibility Factor |
| k | 1.4 | Specific Heat Ratio of Air |

For each of the pressure and flow rates recorded along the full pressure range of the force control device 10, noise in the measurements, along with using an approximate model, will result in different area values for each pair of measurements. In order to find the area value that best fits all the measurements, a standard least squares approach is used to optimize for the area. Rewriting equation (5) into a matrix form yields:

$$\dot{M} = a_{vent} F \tag{10}$$

where $\dot{M}$ is a column vector of the MFM readings arranged as $$\dot{M} = \begin{bmatrix} \dot{m}_1 \\ \dot{m}_2 \\ \vdots \\ \dot{m}_i \end{bmatrix} \tag{11}$$

and F is a column vector of all the computed forcing function values arranged as:

$$F = \begin{bmatrix} f_1 \\ f_2 \\ \vdots \\ f_i \end{bmatrix} \tag{12}$$

Solving equation (10) for $a_{vent}$ via least squares yields:

$$a_{BestFit} = (F^T F)^{-1} F^T \dot{M} \tag{13}$$

Equation (13) yields the area of force overshoot mitigation air passage to machine, to form any of the static air passages described herein, to achieve the desired air flow through the force overshoot mitigation air passage.

Note that, although this analysis focuses on initial contact forces, other process disturbance forces which cause a deviation from the desired force usually act through the same mechanisms, and hence are also alleviated by aspects of the present disclosure.

Figure 10:
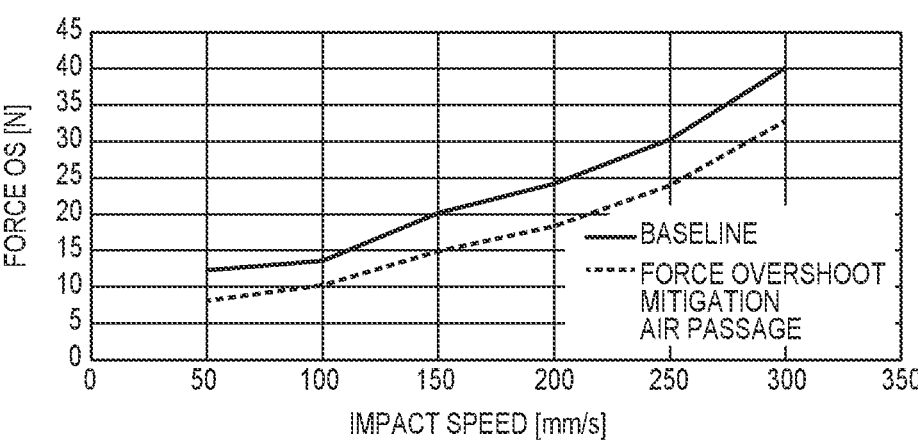
FIG. 10 is a graph of force overshoot vs. impact speed for two robotic force control devices.

FIG. 10 graphs force overshoot magnitude vs. impact speed between a material removal tool 22 and workpiece 24, over a range of impact speeds, for two force control devices. The upper curve plots a baseline force control device, and the lower curve plots a force control device with force overshoot mitigation via an added air passage giving a 28 SLPM of additional air flow, at 25 PSI, according to aspects of the present disclosure (in this case, the force overshoot mitigation air passage was in connectors at the cylinder 14). Over all impact speeds, the force overshoot mitigation device reduced the force overshoot. Note that the improvement, over the baseline measurement, increases as the impact speed, and hence the rate of volumetric change, increases.

Figure 11:
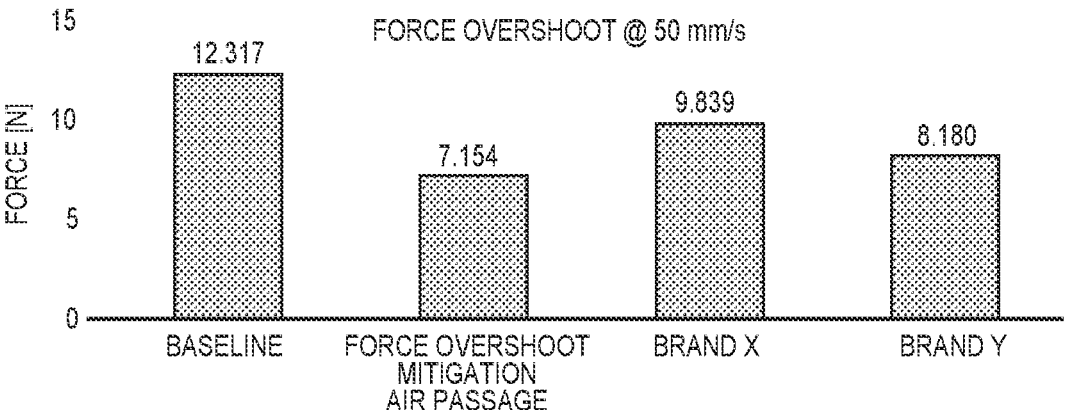
FIG. 11 is a graph plotting force overshoot of four robotic force control devices under controlled operation at an impact velocity of 50 mm/s.
Figure 12:
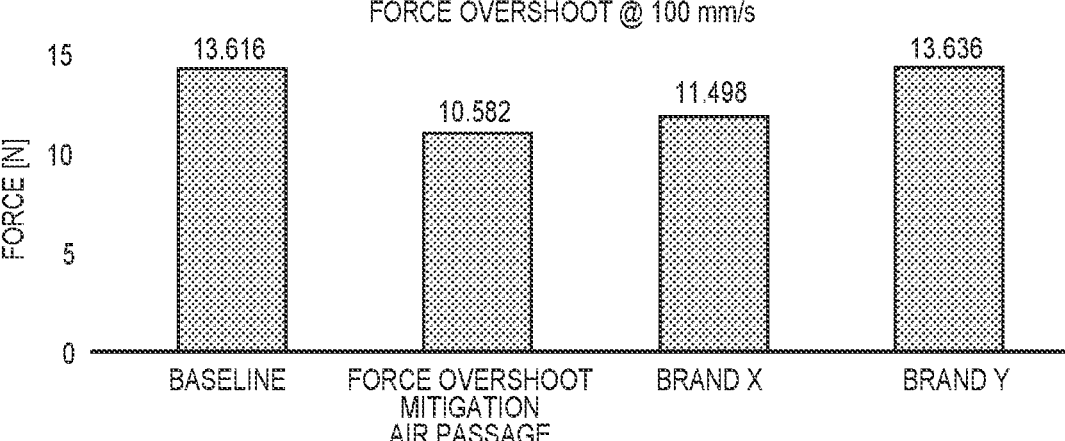
FIG. 12 is a graph plotting force overshoot of four robotic force control devices under controlled operation at an impact velocity of 100 mm/s.

FIGS. 11 and 12 graphs the force overshoot for various force control devices in a common test case of 100 N force applied, equivalent payloads, and the same impact speeds. FIG. 11 graphs the results for an impact speed of 50 mm/s for a baseline force control device (that is, without force overshoot mitigation), a force control device having force overshoot mitigation air passages installed, and two different brands of force control devices (neither of which employs force overshoot mitigation). FIG. 12 graphs the results for the same test case and same force control devices, but with an impact speed of 100 mm/s. In all cases, the force control device having force overshoot mitigation air passages as described herein yields the lowest force overshoot.

Figure 13:
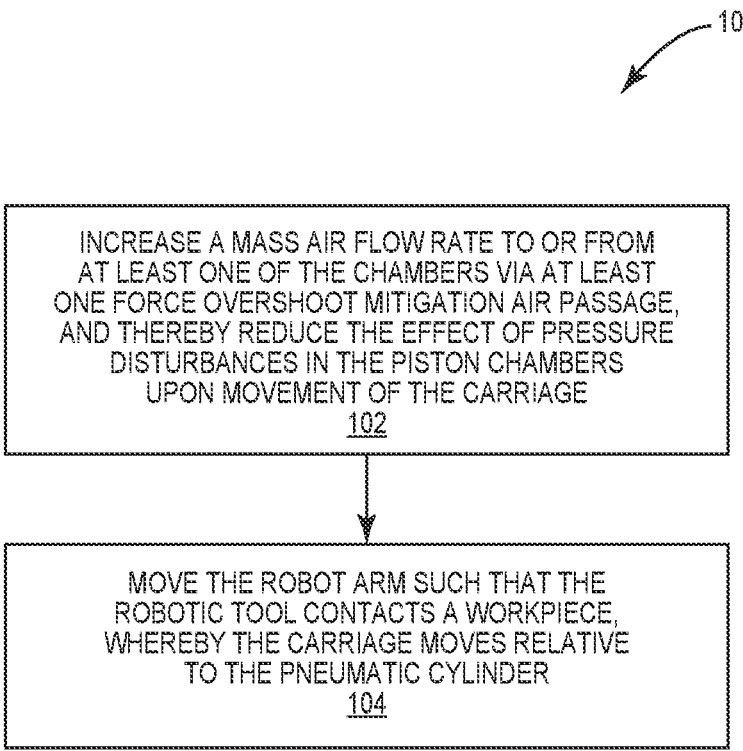
FIG. 13 is a flow diagram of steps of a method 100 of operating a robotic force control device.

FIG. 13 depicts the steps in a method 100 of operating a robotic force control device 10 interposed between a robot arm and a robotic tool 22. The robotic force control device 10 includes a carriage 20 capable of linear motion along an axis and configured to be connected to a robotic tool 22; a pneumatic cylinder 14 containing a piston 16 dividing the cylinder 14 into first and second chambers; a rod 18 connected to the piston 16 and protruding from the cylinder 14, the rod 18 connected to the carriage 20 outside of the cylinder 14; and a pneumatic control system 26 connected in air flow relation with each of the first and second cylinder chambers via respective first and second air lines. A mass air flow rate to or from at least one of the chambers is increased via at least one force overshoot mitigation air passage, and thereby the effect of pressure disturbances in the piston chambers upon movement of the carriage is reduced (block 102). The robot arm is moved such that the robotic tool contacts a workpiece, whereby the carriage moves relative to the pneumatic cylinder (block 104).

Embodiments of the present invention present numerous advantages over the prior art. By adding one or more force overshoot mitigation air passages—either connecting the chambers through the piston 16, or discharging air from a chamber through the cylinder 14 or air line(s)—the force overshoot upon initial contact of a material removal tool 22 with a workpiece 24 is dramatically reduced. This may yield more consistent workpiece finishing results, avoiding deleterious effects which may result from excessive contact force.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description. As used herein, the term "configured to" means set up, organized, adapted, or arranged to operate in a particular way; the term is synonymous with "designed to."

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic force control device configured to be interposed between a robot arm and a robotic tool, comprising:
    a carriage capable of linear motion along an axis and configured to be directly connected to the robotic tool;
    a pneumatic cylinder containing a piston dividing the cylinder into first and second chambers;
    a rod connected to the piston and protruding from the cylinder, the rod directly connected to the carriage outside of the cylinder;
    a pneumatic control system connected in an air flow relation with at least one of the first and second cylinder chambers via corresponding first and second air lines; and at least one force overshoot mitigation air passage configured to increase a mass air flow rate to or from at least one of the chambers and thereby reduce an effect of pressure disturbances in the piston chambers upon movement of the carriage, so as to minimize a force overshoot between the robotic tool and the object, upon initial contact between the robotic tool and the object.

2. The device of claim 1, wherein the force overshoot mitigation air passage comprises a through hole in the piston, connecting the first and second chambers in air flow relationship via the through hole.

3. The device of claim 1, wherein the force overshoot mitigation air passage comprises a through notch formed at the periphery of the piston, connecting the first and second chambers in air flow relationship via the through notch.

4. The device of claim 1, wherein the force overshoot mitigation air passage comprises an annular space between the periphery of the piston and the interior wall of the cylinder, connecting the first and second chambers in air flow relationship via the annular space.

5. The device of claim 1, wherein the piston is formed from a porous and permeable material, and wherein the force overshoot mitigation air passage comprises pores in the piston material which allow air flow through the piston, connecting the first and second chambers in air flow relationship.

6. The device of claim 1, wherein the force overshoot mitigation air passage comprises an annular space between the periphery of the rod and the passage through which the rod exits the cylinder.

7. The device of claim 1, wherein the force overshoot mitigation air passage comprises a static or variable leak in one or both of the first and second air lines.

8. The device of claim 7, wherein one or both of the first and second air lines includes a connector with a plug having a vent area embedded in it.

9. The device of claim 7, wherein one or both of the first and second air lines includes a 2-port valve that allows a vent area to be modified.

10. The device of claim 1, further comprising first and second air line connectors attached to the cylinder and configured to connect the respective first and second air lines to the respective first and second chambers, and wherein the force overshoot mitigation air passage comprises a static leak in one or both of the first and second air line connectors.

11. The device of claim 1, wherein an area of the at least one force overshoot mitigation air passage is determined using a thin-port flow model, based on measured flow rates and corresponding pressures.

12. The device of claim 11, wherein a plurality of force overshoot mitigation air passage areas are determined based on different measured flow rates and pressures, and a best fit force overshoot mitigation air passage area is determined from a least squares fitting of the plurality of determined areas.

13. A method of operating a robotic force control device interposed between a robot arm and a robotic tool, the device comprising a carriage capable of linear motion along an axis and configured to be directly connected to a robotic tool, a pneumatic cylinder containing a piston dividing the cylinder into first and second chambers, a rod connected to the piston and protruding from the cylinder, the rod directly connected to the carriage outside of the cylinder, and a pneumatic control system connected in air flow relation with each of the first and second cylinder chambers via respective first and second air lines, the method comprising:

increasing a mass air flow rate to or from at least one of the chambers via at least one force overshoot mitigation air passage, and thereby reducing the effect of pressure disturbances in the piston chambers upon movement of the carriage; and moving the robot arm such that the robotic tool contacts the workpiece, whereby the carriage moves relative to the pneumatic cylinder;

whereby the force overshoot mitigation air passage minimizes a force overshoot between the robotic tool and the workpiece, upon initial contact between the robotic tool and the workpiece.

14. The method of claim 13, further comprising:

measuring a plurality of mass air flow rates and corresponding pressures; and determining an area of the at least one force overshoot mitigation air passage using a thin-port flow model, based on the measured flow rates and corresponding pressures.

15. The method of claim 14, wherein the thin-port flow model is $\dot{m} = a_{vent} f (P_{Hi}, P_{Lo})$ where $\dot{m}$ is the mass air flow through an orifice;

a is an area of the orifice;

f is a pressure-dependent, non-linear forcing function; and $P_{Hi}$ and $P_{Lo}$ represent the absolute referenced high and low pressure values.

16. The method of claim 15, wherein the pressure-dependent, non-linear forcing function is $$f(P_{Hi}, P_{Lo}) = \begin{cases} \alpha P_{Hi} \sqrt{\left(\frac{P_{Lo}}{P_{Hi}}\right)^{\frac{2}{k}} - \left(\frac{P_{Lo}}{P_{Hi}}\right)^{\frac{k}{k+1}}} & \frac{P_{Hi}}{P_{Lo}} \le \theta \\ \beta P_{Hi} & \frac{P_{Hi}}{P_{Lo}} > \theta \end{cases}$$

where the constants $\alpha$, $\beta$, and $\theta$ are given by:

$$\alpha = C \sqrt{\frac{2M}{ZRT} \frac{k}{k-1}}$$

$$\beta = C \sqrt{\frac{kM}{ZRT} \left(\frac{2}{k+1}\right)^{\frac{k+1}{k-1}}}$$

$$\theta = \left(\frac{k+1}{2}\right)^{\frac{k}{k-1}}$$

where

T is the Temperature;

M is the Molecular Mass of Air;

R is the Universal Gas Constant;

Cd is the Discharge Coefficient;

Z is the Compressibility Factor; and k is the Specific Heat Ratio of Air.

\* \* \* \* \*